UNITED STATES PATENT OFFICE.

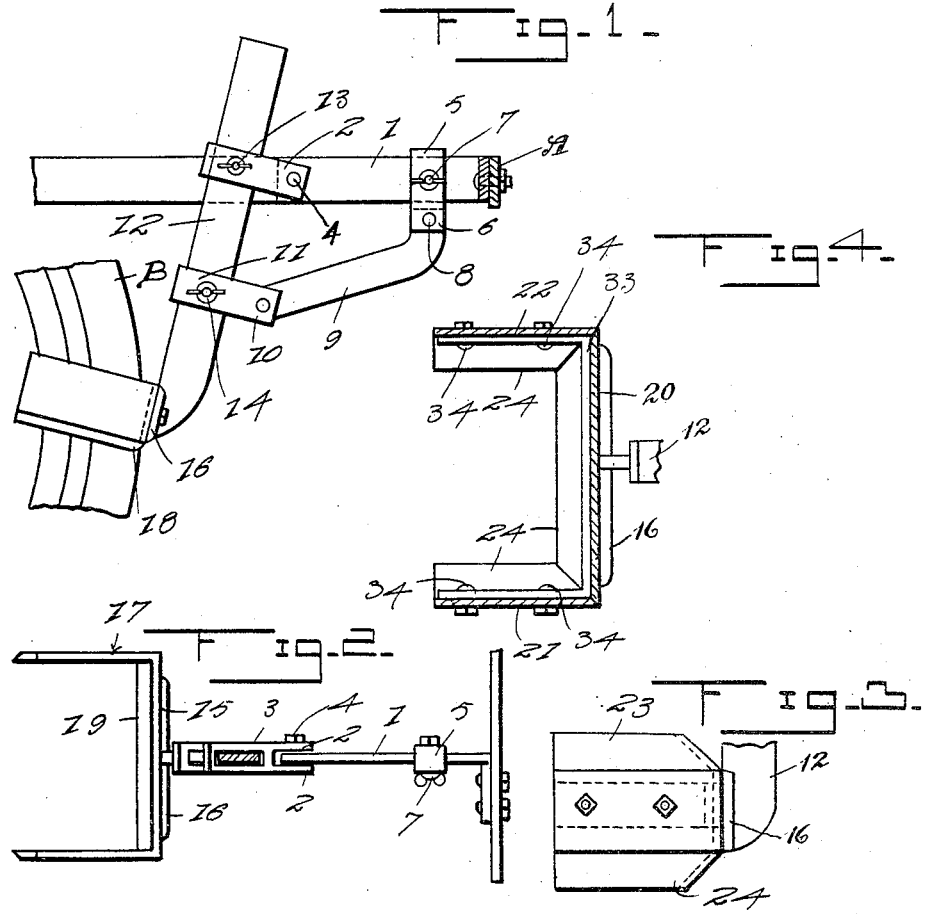

CHARLES C. MADISON, OF SCANDIA, KANSAS.

WHEEL-SCRAPER.

1,258,349. Specification of Letters Patent. Patented Mar. 5, 1918.

Application filed June 10, 1916. Serial No. 102,937.

*To all whom it may concern:*

Be it known that I, CHARLES C. MADISON, a citizen of the United States, residing at Scandia, in the county of Republic and State of Kansas, have invented certain new and useful Improvements in Wheel-Scrapers; and I do hereby declare the following to be a full, clear, and exact description of the invention, such as will enable others skilled in the art to which it appertains to make and use the same.

The object of this invention is the provision of a simple, durable and efficient scraping device adapted particularly for scraping a wheel of a traction engine, and which can be conveniently mounted on the body of the vehicle and designed to have adjustment thereon so as to admit of the scraper being moved into and out of engagement with the wheel and also positioned at points equidistances from the wheel.

Other objects will appear and be better understood from that embodiment of my invention of which the following is a specification, reference being had to the accompanying drawings forming a part thereof, in which:

Figure 1 is a side elevation of the scraping device, showing the same in operative position, Fig. 2 is a top plan view thereof, showing the scraper removed from operative position, Fig. 3 is a side view of a modified form of scraper, Fig. 4 is a horizontal section, taken through Fig. 3.

Referring to the drawings in detail, and particularly to Fig. 1 the scraper illustrated therein consists of a horizontally disposed arm 1, one end of which is attached to a portion of the frame A of a vehicle, and the free end of the arm extends in the direction of one of the wheels B and is received between ears 2, carried by one end of a rectangular shaped collar 3. A bolt 4 extends through alined openings in the ears 2 and the adjacent free end of the arm 1, and pivotally connects the collar to the said arm. Slidably mounted on the arm 1 is another rectangular shaped collar 5, from the lower end of which depends a pair of spaced ears 6. A set screw 7 is adjustably mounted in an opening in one side of the collar 5 and against the adjacent side of the arm 1, and serves to hold the collar 5 in different adjusted positions. The ears 6 on the collar 5 have pivotally connected therebetween, by means of a pin 8, the upper end of a diagonally extending link 9, the lower end of which is pivotally mounted between the ears 10 carried by a third rectangular shaped collar 11, which is located below the collar 2 on the free end of the arm 1. A vertically disposed upright 12 is adjustably mounted in the collar 11 and is held in different adjusted positions by means of set screws 13 and 14, which are adjustable through the sides of the collars 2 and 11 and against the uprights 12. The lower end of the upright 12 is provided with laterally extending arms 15 and 16, which are arranged in engagement with the outer side of the bight portion of a U-shaped frame 17, and secured thereto in any suitable manner. The U-shaped frame straddles the wheels 3 and has the lower edges of the sides and the bight portion beveled, as shown at 18 and 19, so as to scrape against the side rim of the wheels.

The scraper illustrated in Figs. 3 and 4 includes a U-shaped frame, which is adapted to straddle the wheel and is formed of three separate sections, namely, a connecting portion 20 and opposite sides 21 and 22. Each of the sections has its longitudinal edges bent inwardly, in diverging relation, to provide upper and lower spacing blades 23 and 24. These upper and lower blades on the sides 21 and 22 and the connecting portion 20, admit of the sides of the tread surface of the wheel being scraped when the wheel is rotated in either a forward or reverse direction. The connecting portion 20 of the U-shaped scraping frame is carried by the connecting portion for the sides of the U-shaped attaching frame 26, by means of bolts 27. The sides, designated 28, of the U-shaped attaching frame extend rearwardly of the U-shaped scraping frame and have adjustable connection with a pair of parallel spaced bars 29, by means of bolts 30 which extend through the sides of the U-shaped attaching frame and through slots 31 in the bars 29, and have nuts 32 turned on their outer ends and adjustable against the outer sides of the bars 29 so as to hold the attaching frame in adjusted position. The bars 29 are adapted to be mounted in any suitable manner to the frame of the vehicle. The sides 21 and 22 of the U-shaped scraping frame are connected to the connecting portion for the sides of the U-shaped bracket 33, which bracket is positioned within the U-shaped scraper by means of the bolts 27, and the sides of the frame 33 have connection with the sides of the U-shaped frame by means of bolts 34.

By mounting the scrapers in the different manners above described, the scraper can be conveniently moved into engagement or out of engagement with the U-shaped wheel, as desired.

Having thus described my invention what I claim as new, is:

1. The combination with a vehicle body and one of the vehicle wheels, of a horizontally disposed arm having one end connected with the body and having its free end extending in the direction of the wheel, a collar pivotally mounted on the free end of the horizontal arm, a diagonal arm disposed below the horizontal arm, means for pivotally and slidably connecting the upper end of the diagonal arm to the horizontal arm, a second collar pivoted to the lower end of the diagonally extending arm and underlying the collar on the free end of the horizontal arm, a vertically disposed and adjustable upright mounted in the collars, and a scraper carried by the lower end of the uprights and adapted to engage the wheel.

2. The combination with a vehicle body and one of the vehicle wheels, of a horizontally disposed arm having one end connected with the body and having its free end extending in the direction of the wheel, an upright arm, a scraper carried by the arm, a diagonal arm disposed below the horizontal arm and connecting the horizontal arm with the upright arm, and means for pivotally and slidably supporting said upright arm to the horizontal support for movement into and out of engagement with the wheel.

3. A vehicle wheel scraper including a support, a U-shaped horizontally disposed frame carried by the support and adapted to straddle the wheel, said U-shaped frame having its arms arranged in parallel relation to each other and having the longitudinal side edges of the arms and the longitudinal edges of the bight portion bent inwardly toward the wheel to provide scraping blades adapted to engage the adjacent surfaces of the vehicle wheel.

In testimony whereof I affix my signature in presence of two witnesses.

CHARLES C. MADISON.

Witnesses:
HERMAN T. AMBERG,
MILTON A. ELLIS.

Copies of this patent may be obtained for five cents each, by addressing the "Commissioner of Patents, Washington, D. C."